United States Patent
Kim et al.

(10) Patent No.: US 7,684,359 B2
(45) Date of Patent: Mar. 23, 2010

(54) METHOD FOR COMPENSATING SAMPLING FREQUENCY OFFSET IN OFDM COMMUNICATION SYSTEM AND OFDM SIGNAL RECEIVING APPARATUS FOR COMPENSATING SAMPLING FREQUENCY OFFSET

(75) Inventors: Kwang-chul Kim, Seoul (KR); Shi-chang Rho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1024 days.

(21) Appl. No.: 11/357,173

(22) Filed: Feb. 21, 2006

(65) Prior Publication Data

US 2006/0187816 A1    Aug. 24, 2006

(30) Foreign Application Priority Data

Feb. 18, 2005    (KR) ...................... 10-2005-0013534

(51) Int. Cl.
*H04B 7/204* (2006.01)
(52) U.S. Cl. ........................ 370/319; 370/344
(58) Field of Classification Search ................ 370/310, 370/315, 316, 319, 321, 324; 375/354, 362
See application file for complete search history.

(56) References Cited

U.S. PATENT DOCUMENTS

| 2002/0126220 A1* | 9/2002 | Wilson et al. ............... 348/518 |
| 2002/0196731 A1* | 12/2002 | Laroia et al. ................ 370/206 |
| 2003/0031121 A1* | 2/2003 | Sudo .......................... 370/203 |
| 2007/0075899 A1* | 4/2007 | Inaba ......................... 342/387 |

FOREIGN PATENT DOCUMENTS

WO    WO 99/53667 A1    10/1999

* cited by examiner

*Primary Examiner*—Chi H Pham
*Assistant Examiner*—Fan Ng
(74) *Attorney, Agent, or Firm*—Sughrue Mion, PLLC

(57) ABSTRACT

An OFDM signal receiving apparatus and method compensates for a sampling frequency offset. Such an apparatus includes an offset estimating unit for estimating an offset for a sampling frequency that is applied to an FFT of an OFDM signal in a tracking mode, a channel estimating unit for estimating a channel delay profile using a CIR, and an offset compensating unit for compensating for an influence due to the offset by using the duration of the FFT interval transition due to the estimated offset, profile duration of the estimated channel delay profile and duration of a guard interval included in an OFDM symbol to determine a location of the channel delay profile on the guard interval. Accordingly, it is possible to compensate for a sampling frequency offset even if using a general oscillator and not a VCXO, which results in lowering cost and power consumption.

20 Claims, 8 Drawing Sheets

(a) positive offset (b) negative offset

FIG. 8

(a) positive offset (b) negative offset

US 7,684,359 B2

METHOD FOR COMPENSATING SAMPLING FREQUENCY OFFSET IN OFDM COMMUNICATION SYSTEM AND OFDM SIGNAL RECEIVING APPARATUS FOR COMPENSATING SAMPLING FREQUENCY OFFSET

This application claims benefit under 35 U.S.C. §119 from Korean Patent Application No. 2005-13534, filed on Feb. 18, 2005, the entire content of which is incorporated herein by reference.

BACKGROUND OF THE INVENTION

1. Field of the Invention

Apparatus and methods according to the present invention relate to methods for compensating a sampling frequency offset and an Orthogonal Frequency Division Multiplexing (OFDM) signal receiving apparatus thereof. More particularly, they relate to methods for compensating a sampling frequency offset for preventing Inter Symbol Interference (ISI) from occurring in a receiving apparatus which is used in OFDM communicating systems such as a terrestrial Digital Multimedia Broadcasting (DMB) systems, and a OFDM signal receiving apparatus thereof.

2. Description of the Related Art

Figure 1:
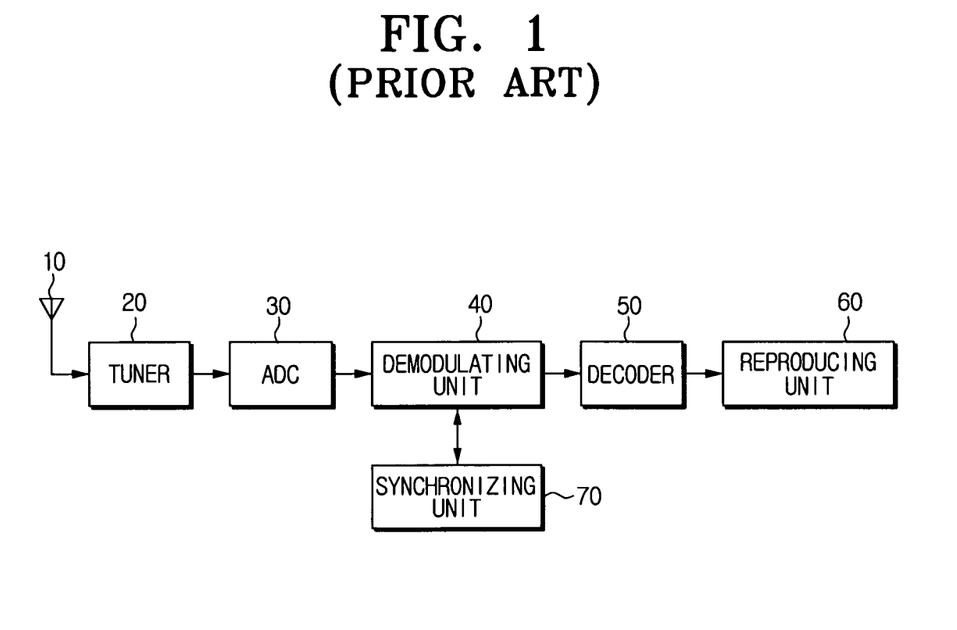
FIG. 1 is a block diagram of a general OFDM receiving apparatus.

FIG. 1 is a block diagram of a general OFDM receiving apparatus. With reference to FIG. 1, the OFDM receiving apparatus comprises an antenna 10, a tuner 20, an analog-to-digital computer (ADC) 30, a demodulating unit 40, a decoder 50, a reproducing unit 60, and a synchronizing unit 70.

An analog OFDM broadcasting signal in a specific frequency band that is tuned by the tuner 20, among OFDM broadcasting signals fed through an antenna 10, is converted into a digital OFDM broadcasting signal by the Analog to Digital Converter (ADC) 30. Then, the demodulating unit 40 demodulates the digital OFDM broadcasting signal by implementing a Fast Fourier Transform (FFT), sub-carrier demodulation, deinterleaving, channel decoding, etc. on the digital OFDM broadcasting signal that was converted by the ADC 30. At this time, the synchronizing unit 70 may implement a function for compensating for a sampling frequency offset that is used by the demodulating unit 40 to implement the FFT. The OFDM broadcasting signal demodulated by the demodulating unit 40 is decoded into an original image signal by means of MPEG decoding by the decoder 50, and then reproduced by means of the reproducing unit 60.

Figure 2:
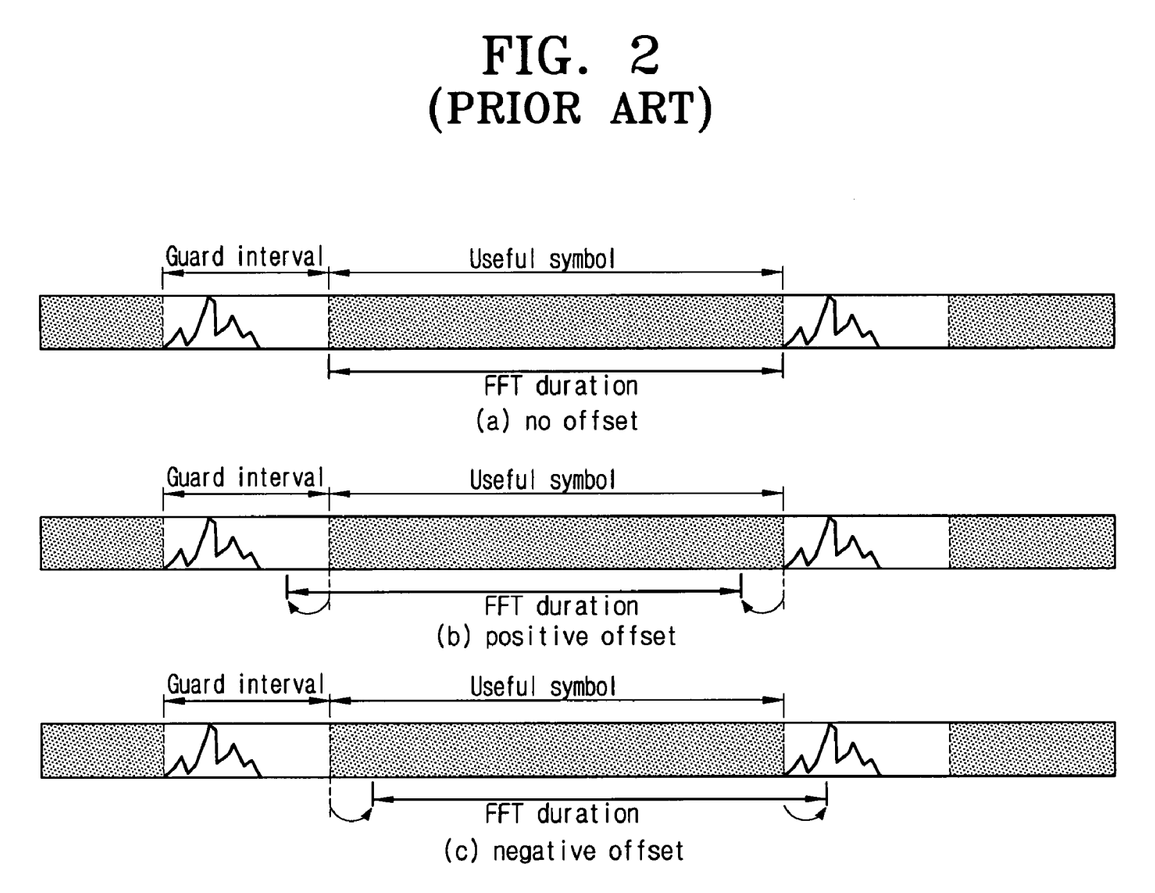
FIG. 2 is a diagram that illustrates an influence due to sampling frequency offset.

FIG. 2 is a drawing that illustrates an influence on a signal due to the sampling frequency offset applied to the FFT. In FIG. 2, "(a) no offset" illustrates a case where a sampling frequency offset does not occur, "(b) positive offset" illustrates a case where a positive sampling frequency offset occurs, and "(c) negative offset" illustrates a case where a negative sampling frequency offset occurs.

As can be known in FIGS. 2 (b) and (c), the occurrence of the sampling frequency offset results in an FFT interval transition. If the sampling frequency offset is small so that the FFT interval transition is relatively small, the offset does not become a problem. However, if the sampling frequency offset is large so that the FFT interval transition is relatively large, ISI may take place.

Figure 3:
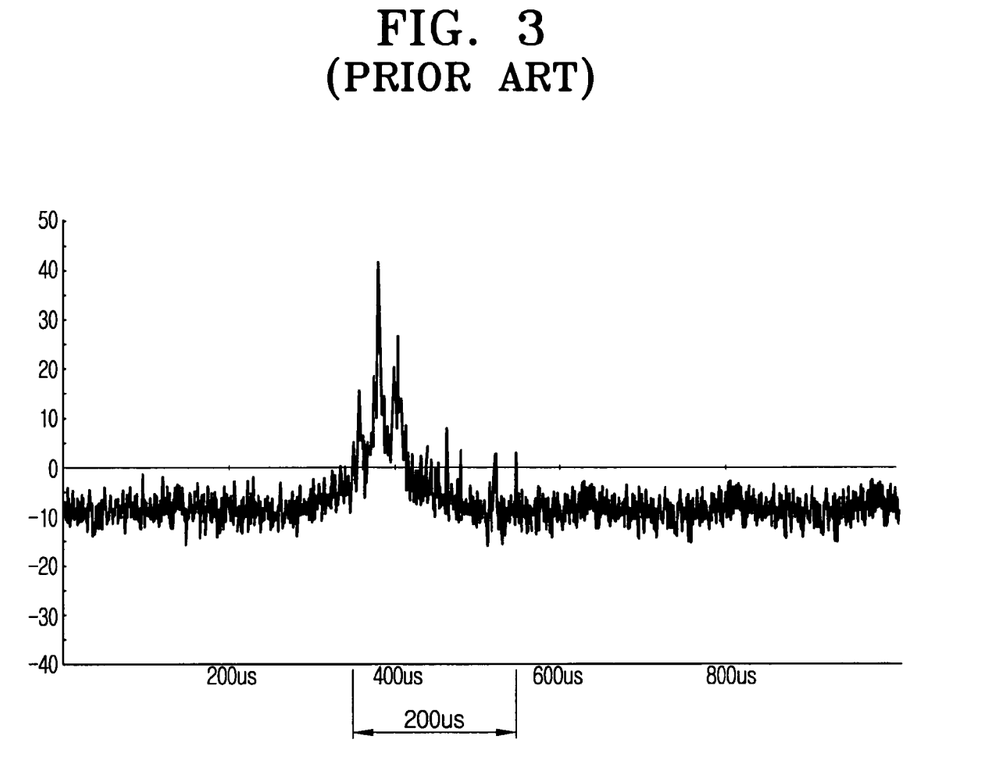
FIG. 3 is a diagram that shows an example of a channel delay profile (CDP)

Meanwhile, if the duration of a channel delay profile is so long that it nearly comes close to the duration of a guard interval included in OFDM symbols, it is more likely that ISI occurs. FIG. 3 exemplifies a channel delay profile having a duration of 200 μs. If it is assumed that FIG. 3 shows a profile for a local network, it is obvious that the duration of the channel delay profile for a single frequency network becomes longer than that of FIG. 3.

In view of such facts, given that the guard interval has a duration of '246 μs', the duration of the channel delay profile may nearly come close to that of the guard interval. Therefore, there is an immediate need to compensate for the sampling frequency offset.

Conventionally, there was universally used a method for compensating for a sampling frequency offset by means of sampling frequency stabilization using a Voltage Controlled Crystal Oscillator (VCXO).

However, since a VCXO is expensive and has a high power consumption, it implies the problem of the OFDM receiving apparatus being expensive and having a high power consumption. Accordingly, if an inexpensive general oscillator is used instead of the VCXO, a method for compensating for the sampling frequency offset is needed.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. The present invention can solve the above drawbacks and other problems associated with the conventional arrangement. An embodiment of the present invention provides a method for compensating for a sampling frequency offset that may prevent ISI from occurring in a receiving apparatus used in an OFDM communication system such as a terrestrial DMB system.

The foregoing and other aspects and advantages are substantially realized by providing OFDM receiving apparatus comprising an offset estimating unit for estimating offset for a sampling frequency that is used to Fast Fourier Transform (FFT) an Orthogonal Frequency Division Multiplexing (OFDM) signal in a tracking mode; a channel estimating unit for estimating a channel delay profile using a channel impulse response; and an offset compensating unit for compensating for an influence due to the offset by using the duration of the FFT interval transition due to the estimated offset, profile duration of the estimated channel delay profile and duration of a guard interval included in an OFDM symbol in order to determine a location of the channel delay profile on the guard interval.

Further, the offset compensating unit locates the center of the channel delay profile in the center of the guard interval, if the profile duration is equal to or less than a predetermined reference duration.

Further, the reference duration is determined by subtracting double the FFT interval transition duration from the duration of the guard interval.

Further, the offset compensating unit locates the center of the channel delay profile at a predetermined distance from the center of the guard interval in positive direction, if the profile duration is more than a predetermined reference duration, a sum of the profile duration and the FFT interval transition duration is equal to or less than the guard interval duration, and the FFT interval transition is in the positive direction.

Further, the offset compensating unit locates the center of the channel delay profile at a predetermined distance from the center of the guard interval in the negative direction, if the profile duration is more than a predetermined reference duration, a sum of the profile duration and the FFT interval transition duration is equal to or less than the guard interval duration, and the FFT interval transition is in the negative direction.

Further, the channel estimating unit estimates the channel delay profile by detecting paths for which power is equal to or greater than a first reference level in the channel impulse response.

And the first reference level is 25% of the power for the maximum path.

Further, if a sum of the profile duration and the FFT interval transition duration is more than the guard interval duration, the channel estimating unit reestimates the channel delay profile by reducing the profile duration of the channel delay profile such that the sum will be equal to or less than the guard interval duration.

Further, the channel estimating unit reestimates the channel delay profile by detecting paths for which power is equal to or greater than a second reference level that is higher than the first reference level in the channel impulse response.

Further, the offset estimating unit may estimate the offset through transition of the location of the maximum path in the channel impulse response.

This OFDM receiving apparatus further comprises an initial offset estimating unit for estimating initial offset of the sampling frequency through retrieval of a maximum path location in the channel impulse response in the case of an acquisition mode; and an initial offset compensating unit for determining the location of the maximum path as the center of the guard interval to compensate for the influence due to the initial offset.

Meanwhile, a method for compensating for sampling frequency offset according an aspect to the present invention comprises an offset estimating step for estimating offset for a sampling frequency that is used to Fast Fourier Transform (FFT) Orthogonal Frequency Division Multiplexing (OFDM) signal in a tracking mode; a channel estimating step for estimating a channel delay profile using a channel impulse response; and an offset compensating step for compensating for an influence due to the offset by using the duration of the FFT interval transition due to the estimated offset, profile duration of the estimated channel delay profile and duration of a guard interval included in an OFDM symbol in order to determine the location of the channel delay profile on the guard interval.

Further, it is preferable that the offset compensating step locates the center of the channel delay profile in the center of the guard interval, if the profile duration is equal to less than a predetermined reference duration.

Further, the reference duration is determined by subtracting twice the FFT interval transition duration from the duration of the guard interval.

Further, the offset compensating step locates the center of the channel delay profile at a predetermined distance from the center of the guard interval in the positive direction, if the profile duration is more than a predetermined reference duration, a sum of the profile duration and the FFT interval transition duration is equal to or less than the guard interval duration, and the FFT interval transition is in the positive direction.

Further, the offset compensating step locates the center of the channel delay profile at a predetermined distance from the center of the guard interval in the negative direction, if the profile duration is more than a predetermined reference duration, a sum of the profile duration and the FFT interval transition duration is equal to or less than the guard interval duration, and the FFT interval transition is in the negative direction.

Further, the channel estimating step may estimate the channel delay profile by detecting paths for which power is greater than a first reference level in the channel impulse response.

Further, the first reference level is 25% of the power of the maximum path.

Further, if a sum of the profile duration and the FFT interval transition duration is more than the guard interval duration, the channel estimating step reestimates the channel delay profile by reducing the profile duration of the channel delay profile such that the sum will be equal to or less than the guard interval duration.

Further, the channel estimating step reestimates the channel delay profile by detecting paths for which power is equal to or greater than a second reference level that is higher than the first reference level in the channel impulse response.

Further, the offset estimating step may estimate the offset through a transition of the location of the maximum path in the channel impulse response.

This method for compensating sampling frequency offset further comprises an initial offset estimating step for estimating initial offset of the sampling frequency through retrieval of a location of the maximum path in the channel impulse response in the case of an acquisition mode; and an initial offset compensating step for determining the location of the maximum path as the center of the guard interval to compensate for the influence due to the initial offset.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

Apparatuses and methods according to the present invention will be described in greater detail with reference to the accompanying drawings.

Figure 4:
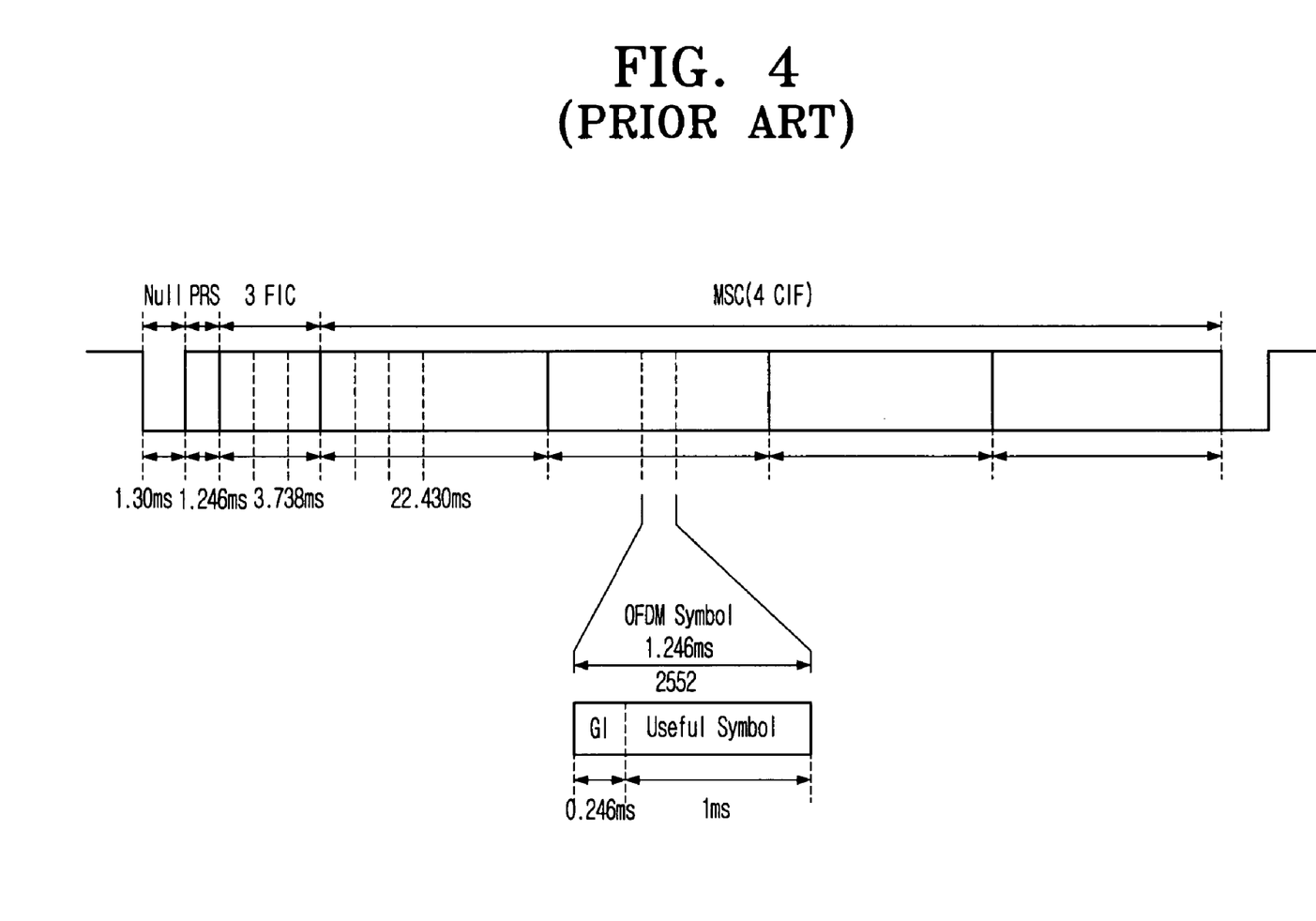
FIG. 4 is a diagram that illustrates a format of a broadcasting signal used in a terrestrial DMB system that is a type of an OFDM communicating system.

FIG. 4 is a drawing that illustrates a format of a broadcasting signal used in a terrestrial Digital Multimedia Broadcasting (DMB) system that is a kind of an OFDM communicating system. Referring to FIG. 4, the DMB signal is composed of Null, Phase Reference Symbol (PRS), 3 Fast Information Channels (FICs) and Main Service Channel (MSC) portions.

Further, the MSC is composed of 4 Common Interleaved Frames (CIFs) and each of the CIFs is composed of 72 OFDM symbols. Further, each of the FDM symbols is composed of guard interval (GI) and a useful symbol.

Figure 5:
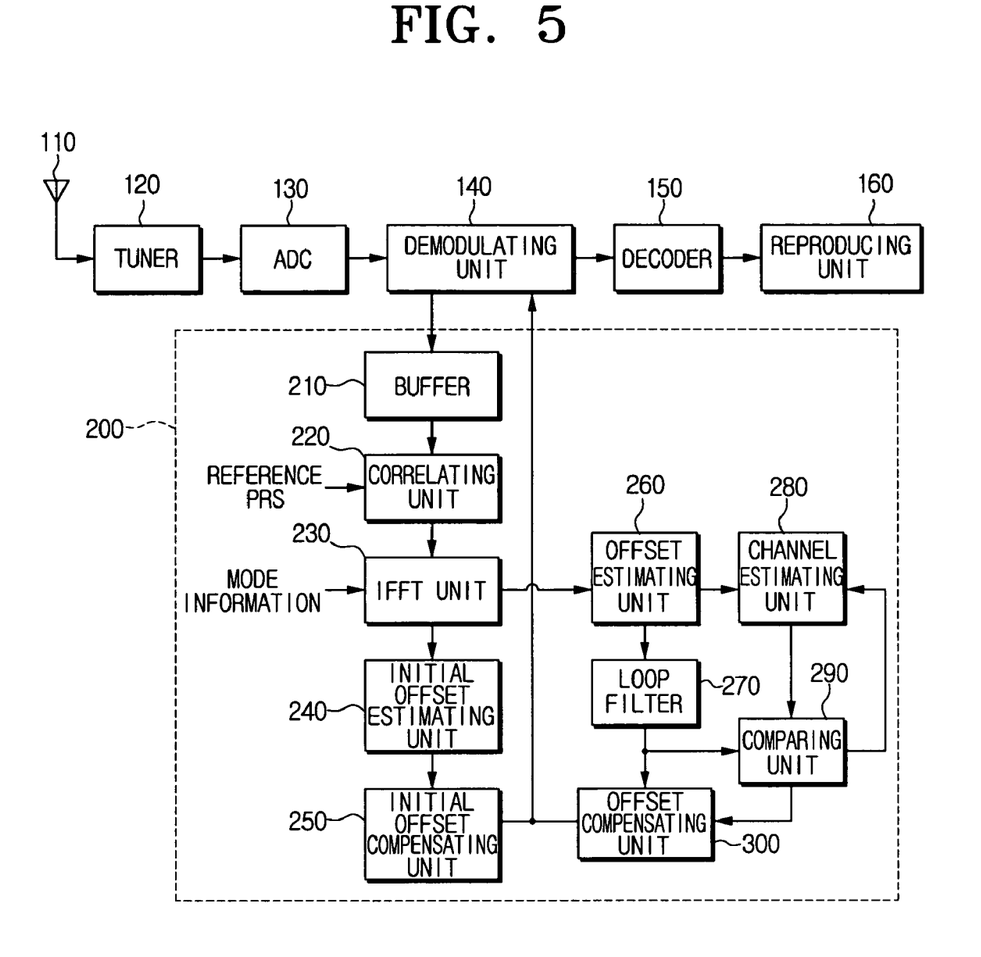
FIG. 5 is a block diagram of an OFDM receiving apparatus that can compensate for a sampling frequency offset according to an embodiment of the present invention.

FIG. 5 is a block diagram of an OFDM receiving apparatus that can compensate for sampling frequency offset according to an embodiment of the present invention. This OFDM receiving apparatus can be used in an OFDM communicating system such as a terrestrial DMB system. This OFDM receiving apparatus can prevent inter symbol interference (ISI) from occurring by compensating for sampling frequency offset.

Referring to FIG. 5, the OFDM receiving apparatus comprises an antenna 110, a tuner 120, an ADC 130, a demodulating unit 140, a decoder 150, a reproducing unit 160, and a synchronizing unit 200.

The tuner 120 can tune an OFDM broadcasting signal in a specific frequency band among OFDM broadcasting signals that are fed through the antenna 110. The Analog to Digital Converter (ADC) 130 can convert the analog OFDM broadcasting signal tuned by the tuner 120 into a digital OFDM broadcasting signal. The demodulating unit 140 can demodulate the OFDM broadcasting signal by performing a Fast Fourier Transform (FFT), sub-carrier demodulation, deinterleaving, channel decoding, etc. on the digital OFDM broadcasting signal converted by the ADC 130. The decoder 150 can decode an original image signal by MPEG decoding the demodulated OFDM broadcasting signal. The reproducing unit 160 can reproduce the decoded original image signal.

Meanwhile, the synchronizing unit 200 can prevent ISI from occurring due to sampling frequency offset when the demodulating unit 140 implements the FFT. More specifically, the synchronizing unit 200 prevents ISI from occurring by estimating the sampling frequency offset and the channel delay profile (CDP), and determining the location of the CDP in the GI.

The synchronizing unit 200 which performs such functions includes a buffer 210, a correlating unit 220, an Inverse FFT (IFFT) unit 230, an initial offset estimating unit 240, an initial offset compensating unit 250, an offset estimating unit 260, a loop filter 270, a channel estimating unit 280, a comparing unit 290, and an offset compensating unit 300.

Figure 6:
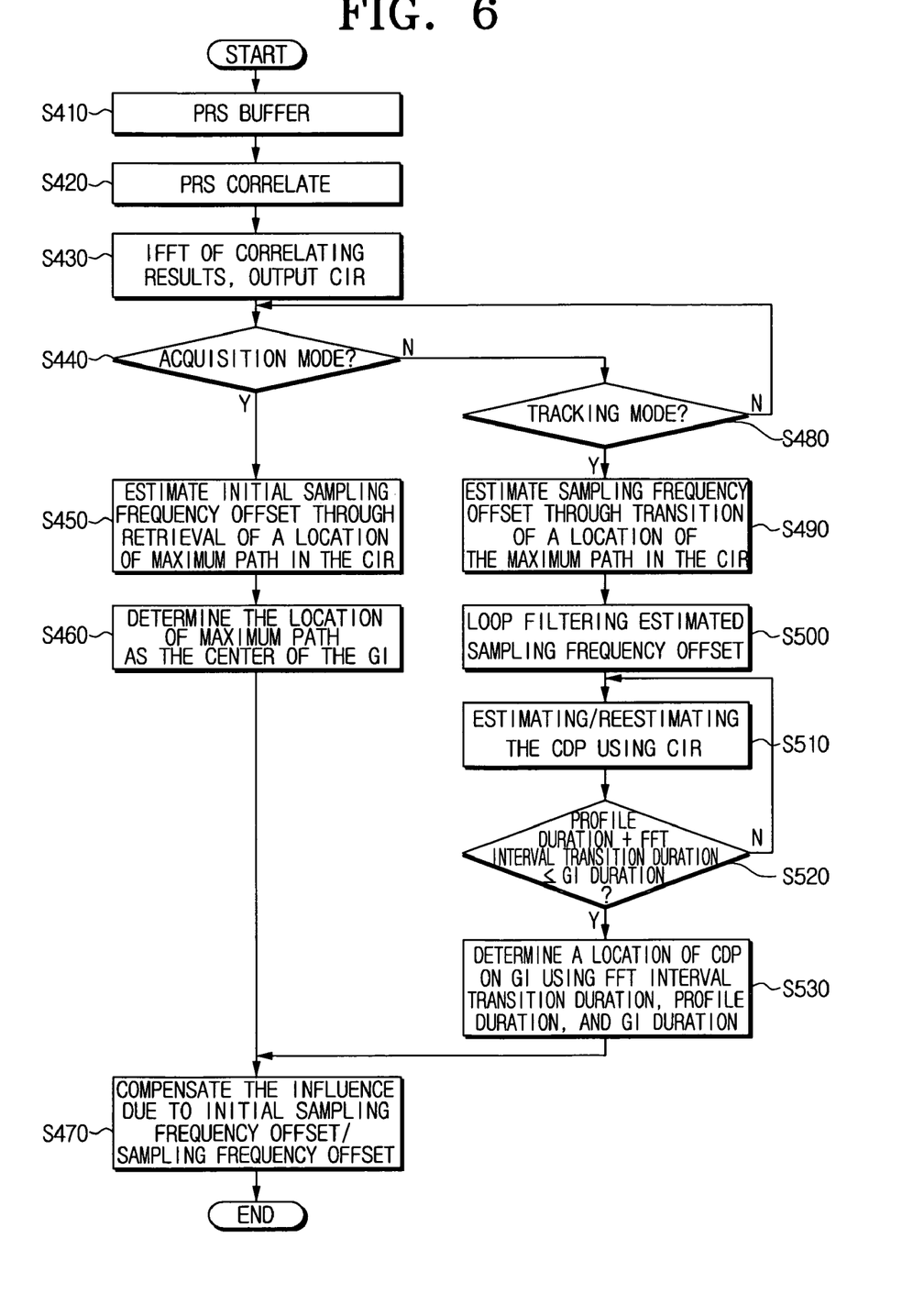
FIG. 6 is a flow diagram that illustrates a method for compensating for a sampling frequency offset according to an embodiment of the present invention.

This OFDM receiving apparatus will be described more specifically with respect to procedures for compensating for a sampling frequency offset with reference to FIG. 5 and FIG. 6. FIG. 6 is a flow diagram that illustrates a method for compensating sampling frequency offset according to an embodiment of the present invention.

Referring to FIG. 5 and FIG. 6, the PRS that is FFTed in the demodulating unit 140 is buffered in buffer 210 residing within the synchronizing unit 200 (S410).

Then, the correlating unit 220 correlates the buffered PRS with a reference PRS, and outputs that correlating results to the IFFT unit 230 (S420). The reference PRS is an already known symbol in this OFDM receiving apparatus.

The IFFT unit 230 performs an Inverse FFT (IFFT) on the correlation results applied from the correlating unit 220, and the IFFT of the correlation results corresponds to a channel impulse response (CIR) (S430). Output routes of the CIR are determined according to a mode information signal applied to the IFFT unit 230. Specifically, if this OFDM receiving apparatus is in an acquisition mode, the CIR is output to the initial offset estimating unit 240, whereas if it is in a tracking mode, the CIR is output to the offset estimating unit 260.

Consequently, if this OFDM receiving apparatus is in the acquisition mode (S440), the initial offset estimating unit 240 to which the CIR is applied estimates initial sampling frequency offset through retrieval of a location of the maximum path in the CIR (S450). Then, the initial offset compensating unit 250 determines the location of the maximum path as the center of the GI (S460).

Thereafter, the demodulating unit 140 follows the results determined in the initial offset compensating unit 250 upon implementing the FFT, so that the influence due to the initial sampling offset may be compensated (S470). That is, it is possible to avoid ISI due to initial sampling frequency offset when the demodulating unit 140 implements the FFT.

Whereas, if the OFDM receiving apparatus is in the tracking mode (S480), the offset estimating unit 260 to which the CIR is applied estimates a sampling frequency offset based on a transition, or displacement, of a location of the maximum path in the CIR (S490). Then, the loop filter 270 stabilizes the sampling frequency offset that is estimated through loop filtering (S500). The stabilized sampling frequency offset is applied to the comparing unit 290 and the offset compensating unit 300 to be described below, respectively.

Meanwhile, the channel estimating unit 280 estimates the CDP using the CIR (S510). More specifically, the channel estimating unit 280 estimates the CDP by detecting paths in the CIR for which power is greater than a first reference level.

It will be appreciated that although the first reference level can be set to 25% of the power in a maximum path (a path of highest power in the CIR) here, it can be set differently to a level other than that level.

Thereafter, the comparing unit 290 may compare 'GI duration' with 'a sum of the profile duration and the FFT interval transition duration'. Here, the profile duration refers to the duration of the CDP, the FFT interval transition duration refers to the duration indicating a degree that the FFT interval transits due to sampling frequency offset, and GI duration itself refers to the duration of the GI. The CDP was estimated in the channel estimating unit 280, and the sampling frequency offset was estimated in the offset estimating unit 260 and then stabilized by the loop filter 270, and GI duration is a known duration, which is '0.246 ms' as shown in FIG. 4.

If the 'sum of the profile duration and the FFT interval transition duration' is equal to or less than the 'GI duration' based on a comparison result from the comparing unit 290, the offset compensating unit 300 can carry out the procedure (S530, S470) of compensating for the sampling frequency offset. Whereas, if the above-mentioned sum is greater than the GI duration, the procedure of reestimating the CDP is carried out by the channel estimating unit 280. The procedure (S530, S470) of compensating for the sampling frequency offset will be described first, and then the procedure (S510) of reestimating the CDP will be described.

If the 'sum of the profile duration and the FFT interval transition duration' is equal to or less than the GI duration (S520), the offset compensating unit 300 may determine the location of the CDP based on the GI using the FFT interval transition duration, the profile duration, and the GI duration (S530).

More specifically, if it is determined that the profile duration is equal to or less than the 'reference duration', the offset compensating unit 300 can locate the center of the CDP in the center of the GI. This corresponds to the case in which the profile duration is relatively short. Here, the 'reference duration' can be set by subtracting twice the FFT interval transition duration from the GI duration. It will be appreciated that the above-mentioned reference duration is not necessarily always the same and can be set to other, different durations.

Figure 7:
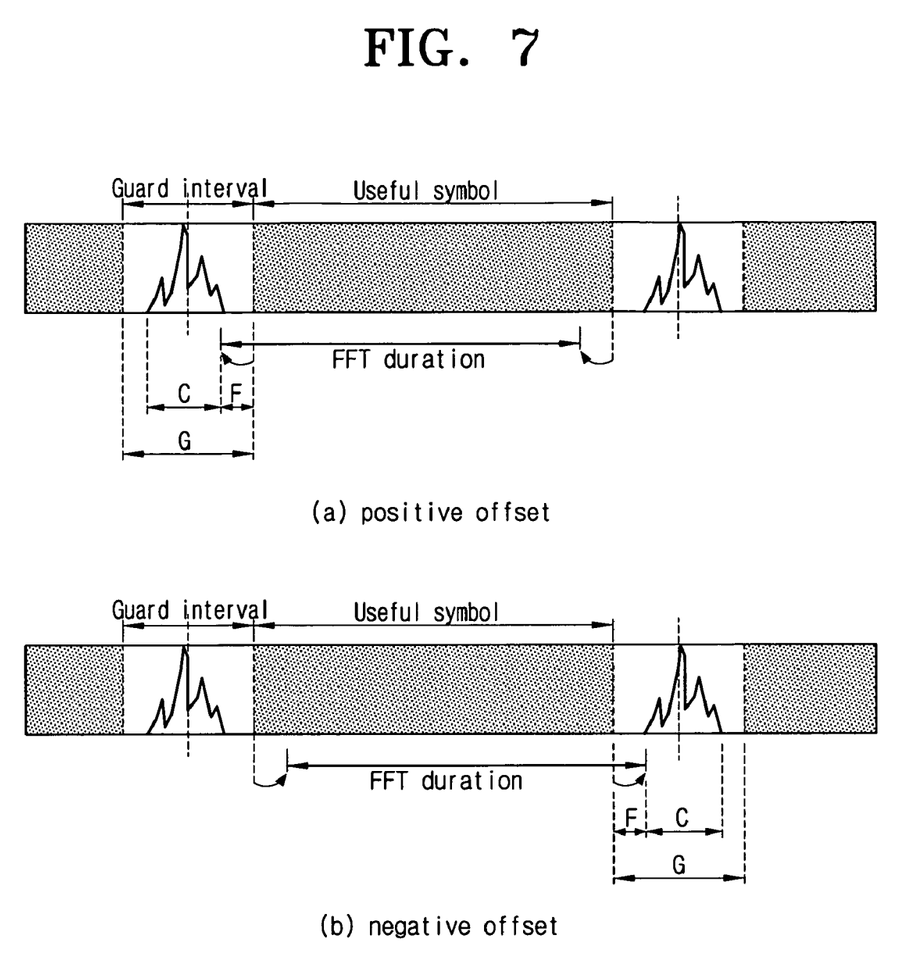
FIG. 7 is a diagram that illustrates a method for locating the center of the CDP if the profile duration is less than a reference duration.

FIG. 7 corresponds to the case in which the profile duration is less than the reference duration (GI duration−2×(FFT interval transition duration)), and shows that the profile duration (C) is the same as the reference duration (G−2×F). And, it is depicted here that the center of the CDP is located in the center of the GI.

As shown, if the center of the CDP is located in the center of the GI when the profile duration (C) equals the reference duration (G−2×F), it can be judged that the ISI is prevented from occurring not only in the case of the FFT interval transition being in the positive direction (that is, (a) positive offset), but also in the case of the FFT interval transition being in the negative direction (that is, (b) negative offset).

Meanwhile, if it is determined that the profile duration is more than above-mentioned reference duration, (that is, the profile duration is relatively long), the offset compensating unit 300 move the CDP so as to locate the center of the CDP a predetermined distance from the center of the GI in either a positive or negative direction. At this time, the spaced direction is the same as the FFT interval transition direction, and the spaced distance follows the FFT interval transition duration. That is, if the FFT interval transition is in the positive direction, the center location of the CDP is spaced a predetermined distance from the center of the GI in the positive direction, whereas if the FFT interval transition is in the negative direction, the center location of the CDP is spaced at a predetermined distance from the center of the GI in negative direction.

Figure 8:
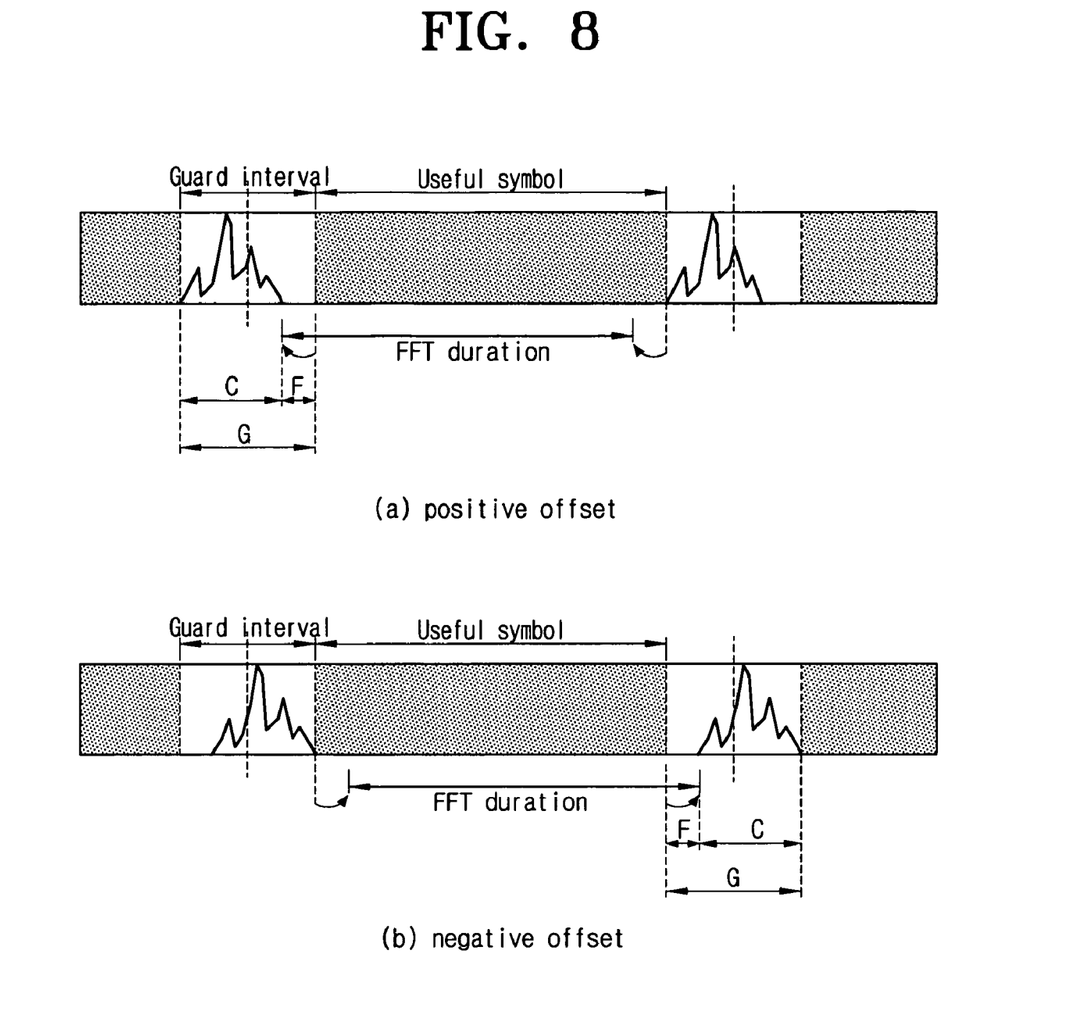
FIG. 8 is a diagram that illustrates a method for locating the center of the CDP if the profile duration is greater than a reference duration.

FIG. 8 shows the case in which the profile duration is greater than the reference duration, and the 'sum of the profile duration (C) and the FFT interval transition duration (F)' equals the GI duration (G). In FIG. 8, "(a) positive offset" refers to an offset in which the FFT interval transition is offset in the positive direction, and it is depicted that the center of the CDP is spaced at a predetermined distance from the center of the GI in a positive direction. Meanwhile, in FIG. 8, "(b) negative offset" refers to an offset in which the FFT interval transition is in a negative direction, and it is depicted in which the center of the CDP is spaced at a predetermined distance from the center of the GI in a negative direction.

Accordingly, it will be appreciated that ISI does not occur in either of the cases illustrated by FIGS. 8 (a) and (b).

Thereafter, the demodulating unit 140 follows the determining result that was carried out by the offset compensating unit 300 in step S530 upon implementing the FFT, so that it is possible to compensate for the influence due to a sampling frequency offset (S470). That is, the demodulating unit 140 can prevent ISI from occurring due to sampling frequency offset upon performing the FFT.

Meanwhile, if a 'sum of the profile duration and the FFT interval transition duration' is more than the 'GI' duration based on the comparison by the comparing unit 290 (S520), the channel estimating unit 280 reestimates the CDP (S510). More specifically, the channel estimating unit 280 reestimates the CDP by reducing the profile duration of the CDP such that the sum will be equal to or less than the GI duration.

At this time, the channel estimating 280 can reestimate the CDP by detecting paths of which power is more than a 'second reference level' in CIR. Here, the 'second reference level' is greater than the first reference level. This is a scheme for reducing the profile duration.

For example, if the first reference level is set 25% as described above, the second reference level can be set to be 30%. It will be appreciated that the second reference level is not limited to a particular level, like the first reference level, but it can be set differently to a level other than 30%.

Next, according to a comparison results in step S520, the procedure of compensating for a sampling frequency offset (S530, S470) by the offset compensating unit 300 or the procedure (S510) of reestimating the CDP by the channel reestimating unit 280 are carried out again. If the procedure (S510) of reestimating the CDP by the channel estimating unit 280 is carried out again, a third reference level can be used that is greater than the second reference level in step S510.

Accordingly, what has been described is a method for preventing ISI from occurring by compensating for the influence due to a sampling frequency offset by estimating the sampling frequency offset and the CDP, and then determining the location of the CDP on the GI appropriately using them.

It will be appreciated that although a terrestrial DMB system is described by way of an example, this present invention is not limited to such as system but can also be applied to OFDM communicating systems other than a terrestrial DMB system.

As was described above, according to various embodiments of the present invention, it is possible to compensate for a sampling frequency offset appropriately even in the case of using a general oscillator. Since a general oscillator is inexpensive and has lower power consumption compared with a VCXO, it is possible to lower cost and power consumption in an OFDM receiving apparatus employing the invention.

The foregoing embodiments and advantages are merely exemplary and are not to be construed as limiting the present invention. The present teachings can be readily applied to other types of apparatuses and methods. Also, the description of these embodiments of the present invention is intended to be illustrative, and not to limit the scope of the claims, and many alternatives, modifications, and variations will be apparent to those skilled in the art.

What is claimed is:

1. An OFDM receiving apparatus, comprising:
an offset estimating unit which estimates offset of a sampling frequency if the receiving apparatus is in a tracking mode, the sampling frequency being used for a Fast Fourier Transform (FFT) of an Orthogonal Frequency Division Multiplexing (OFDM) signal;
a channel estimating unit for estimating a channel delay profile using a channel impulse response of the OFDM signal; and
an offset compensating unit for compensating for an influence due to the offset by using a duration of an FFT interval transition due to the estimated offset, a profile duration of the estimated channel delay profile and a duration of a guard interval included in an OFDM symbol to determine a location of the channel delay profile in the guard interval,
wherein the offset compensating unit adjusts the channel delay profile to locate the center of the channel delay profile within the guard interval, if the profile duration is equal to or less than a predetermined reference duration, and
wherein the offset compensating unit adjusts the channel delay profile to locate the center of the channel delay profile at a predetermined distance from the center of the guard interval if the profile duration is greater than the predetermined reference duration, and a sum of the profile duration and the FFT interval transition duration is equal to or less than the guard interval duration.

2. The OFDM receiving apparatus according to claim 1, wherein the reference duration is determined by subtracting twice the FFT interval transition duration from the duration of the guard interval.

3. The OFDM receiving apparatus according to claim 1, wherein the offset compensating unit adjusts the channel delay profile to locate the center of the channel delay profile at a predetermined distance from the center of the guard interval in a positive direction if the profile duration is greater than a predetermined reference duration, a sum of the profile duration and the FFT interval transition duration is equal to or less than the guard interval duration, and the FFT interval transition is in a positive direction.

4. The OFDM receiving apparatus according to claim 3, wherein the offset compensating unit adjusts the channel delay profile to locate the center of the channel delay profile at a predetermined distance from the center of the guard interval in a negative direction if the profile duration is greater than a predetermined reference duration, a sum of the profile duration and the FFT interval transition duration is equal to or less than the guard interval duration, and the FFT interval transition is in a negative direction.

5. The OFDM receiving apparatus according to claim 1, wherein the channel estimating unit estimates the channel delay profile by detecting a path in which power is equal to or greater than a first reference level in the channel impulse response.

6. The OFDM receiving apparatus according to claim 5, wherein the first reference level is 25% of the power of the maximum path among one or more paths detected in the channel delay profile.

7. The OFDM receiving apparatus according to claim 5, wherein if a sum of the profile duration and the FFT interval transition duration is greater than the guard interval duration, the channel estimating unit reestimates the channel delay profile by reducing the profile duration of the channel delay profile such that the sum is equal to or less than the guard interval duration.

8. The OFDM receiving apparatus according to claim 7, wherein the channel estimating unit reestimates the channel delay profile by detecting a path in which power is equal to or greater than a second reference level that is higher than the first reference level in the channel impulse response.

9. The OFDM receiving apparatus according to claim 1, wherein the offset estimating unit estimates the sampling frequency offset based on a transition of a location of the maximum path in the channel impulse response.

10. The OFDM receiving apparatus according to claim 1, comprising further:
an initial offset estimating unit for estimating an initial offset of the sampling frequency through retrieval of a location of a maximum path in the channel impulse response if the receiver is in an acquisition mode; and
an initial offset compensating unit for determining an adjustment to position the location of the maximum path to the center of the guard interval to compensate for an influence due to the initial offset.

11. A method for compensating for a sampling frequency offset, the method being performed by an OFDM receiving apparatus and comprising:
an offset estimating step for estimating offset of a sampling frequency in a tracking mode, the sampling frequency being used for a Fast Fourier Transform (FFT) of an Orthogonal Frequency Division Multiplexing (OFDM) signal;

a channel estimating step for estimating a channel delay profile by using a channel impulse response of the OFDM signal; and
an offset compensating step for compensating an influence due to the sampling frequency offset by using a duration of an FFT interval transition due to the estimated sampling frequency offset, a profile duration of the estimated channel delay profile and a duration of a guard interval included in an OFDM symbol to determine a location of the channel delay profile within the guard interval,
wherein the offset compensating step adjusts the channel delay profile to locate the center of the channel delay profile in the center of the guard interval if the profile duration is equal to or less than a predetermined reference duration, and
wherein the offset compensating step adjusts the channel delay profile to locate the center of the channel delay profile at a predetermined distance from the center of the guard interval if the profile duration is greater than the predetermined reference duration, and a sum of the profile duration and the FFT interval transition duration is equal to or less than the guard interval duration.

12. The method for compensating for a sampling frequency offset according to claim 11, wherein the reference duration is determined by subtracting twice the FFT interval transition duration from the duration of the guard interval.

13. The method for compensating for a sampling frequency offset according to claim 11, wherein the offset compensating step adjusts the channel delay profile to locate the center of the channel delay profile at a predetermined distance from the center of the guard interval in a positive direction if the profile duration is greater than a predetermined reference duration, a sum of the profile duration and the FFT interval transition duration is equal to or less than the guard interval duration, and the FFT interval transition is in a positive direction.

14. The method for compensating for a sampling frequency offset according to claim 13, wherein the offset compensating step adjusts the channel delay profile to locate the center of the channel delay profile at a predetermined distance from the center of the guard interval in a negative direction if the profile duration is greater than a predetermined reference duration, a sum of the profile duration and the FFT interval transition duration is equal to or less than the guard interval duration, and the FFT interval transition is in a negative direction.

15. The method for compensating for a sampling frequency offset according to claim 11, wherein the channel estimating step estimates the channel delay profile by detecting a path in which power is greater than a first reference level in the channel impulse response.

16. The method for compensating for a sampling frequency offset according to claim 15, wherein the first reference level is 25% of the power of the maximum path among one or more paths detected in the channel delay profile.

17. The method for compensating for a sampling frequency offset according to claim 15, wherein if a sum of the profile duration and the FFT interval transition duration is greater than the guard interval duration, the channel estimating step reestimates the channel delay profile by reducing the profile duration of the channel delay profile such that the sum is equal to or less than the guard interval duration.

18. The method for compensating for a sampling frequency offset according to claim 17, wherein the channel estimating step reestimates the channel delay profile by detecting a path of which power is equal to or greater than a second reference level that is higher than the first reference level in the channel impulse response.

19. The method for compensating for a sampling frequency offset according to claim 11, wherein the offset estimating step estimates the sampling frequency offset based on a transition of a location of the maximum path in the channel impulse response.

20. The method for compensating for a sampling frequency offset according to claim 11, comprising further:

an initial offset estimating step for estimating an initial offset of the sampling frequency through retrieval of a location of the maximum path in the channel impulse response if in an acquisition mode; and an initial offset compensating step for determining an adjustment to position the location of the maximum path to the center of the guard interval to compensate for the influence due to the initial offset.

* * * * *